United States Patent [19]

Lazaridis

[11] Patent Number: 5,268,562
[45] Date of Patent: Dec. 7, 1993

[54] OPTICAL DUAL SENSOR BAR CODE SCANNING SYSTEM

[75] Inventor: Mihal Lazaridis, Waterloo, Canada

[73] Assignee: National Film Board of Canada, Saint-Laurent, Canada

[21] Appl. No.: 882,551

[22] Filed: May 13, 1992

Related U.S. Application Data

[63] Continuation of Ser. No. 501,550, Mar. 30, 1990.

[51] Int. Cl.[5] .............................................. G06K 7/10
[52] U.S. Cl. .................................... 235/462; 235/463; 250/566
[58] Field of Search ................. 235/462, 463; 250/566, 250/568, 570, 571

[56] References Cited

U.S. PATENT DOCUMENTS

| | | |
|---|---|---|
| 3,891,831 | 6/1975 | Coles, Jr. . |
| 3,898,689 | 8/1975 | D'Orazio et al. . |
| 3,949,193 | 4/1976 | Dowdell . |
| 3,961,164 | 6/1976 | Reed et al. . |
| 3,999,043 | 12/1976 | Reiss et al. ........................ 235/463 |
| 4,000,397 | 12/1976 | Hebert et al. ...................... 235/463 |
| 4,176,260 | 11/1979 | Ward et al. ......................... 235/475 |
| 4,473,746 | 9/1984 | Edmonds ............................ 250/216 |
| 4,564,929 | 1/1986 | Yonezawa et al. . |
| 4,629,876 | 12/1986 | Kubota et al. ..................... 235/473 |
| 4,638,170 | 1/1987 | Kubota ............................... 250/566 |
| 4,707,790 | 11/1987 | Gomes et al. . |
| 4,740,675 | 4/1988 | Brosnan et al. .................... 235/462 |
| 4,831,609 | 5/1989 | Suzuki . |
| 4,835,544 | 5/1989 | Winterburn . |
| 4,863,173 | 9/1989 | Chen . |
| 4,961,086 | 10/1990 | Takenaka ............................. 355/41 |

Primary Examiner—John Shepperd
Attorney, Agent, or Firm—Ronald S. Kosie; Robert Brouillette

[57] ABSTRACT

The present invention is directed to a system for optically scanning a bar code particularly a bar code provided on a generally transparent or translucent media through which light can be projected. In particular, the invention is directed to a system for optically scanning a bar code provided on the edge of picture film, preferably motion picture film. The system includes a light source on one side of the generally transparent media and an arrangement for moving the media past the light source such that the bar code interrupts the light and produces a modulated light signal according to the characteristics of the bar code on the opposite side of the media. An optically sensing arrangement is provided on the opposite side of the media for sensing the modulated light signal and includes at least two sensors spaced in the direction of movement of the generally transparent media. With this arrangement, the signal output of the sensors are shifted in time according to the spacing between the sensors. The system includes a processing arrangement for processing the signal output of the sensors to extract the bar code used to modulate the light passing through the generally transparent media by the signal output of the sensors. With this arrangement, accurate reading of the bar code is possible with the media moving at substantial speeds past the scanning system. This system has particular application for film, but could be used in other bar code reading applications using reflected light.

8 Claims, 6 Drawing Sheets

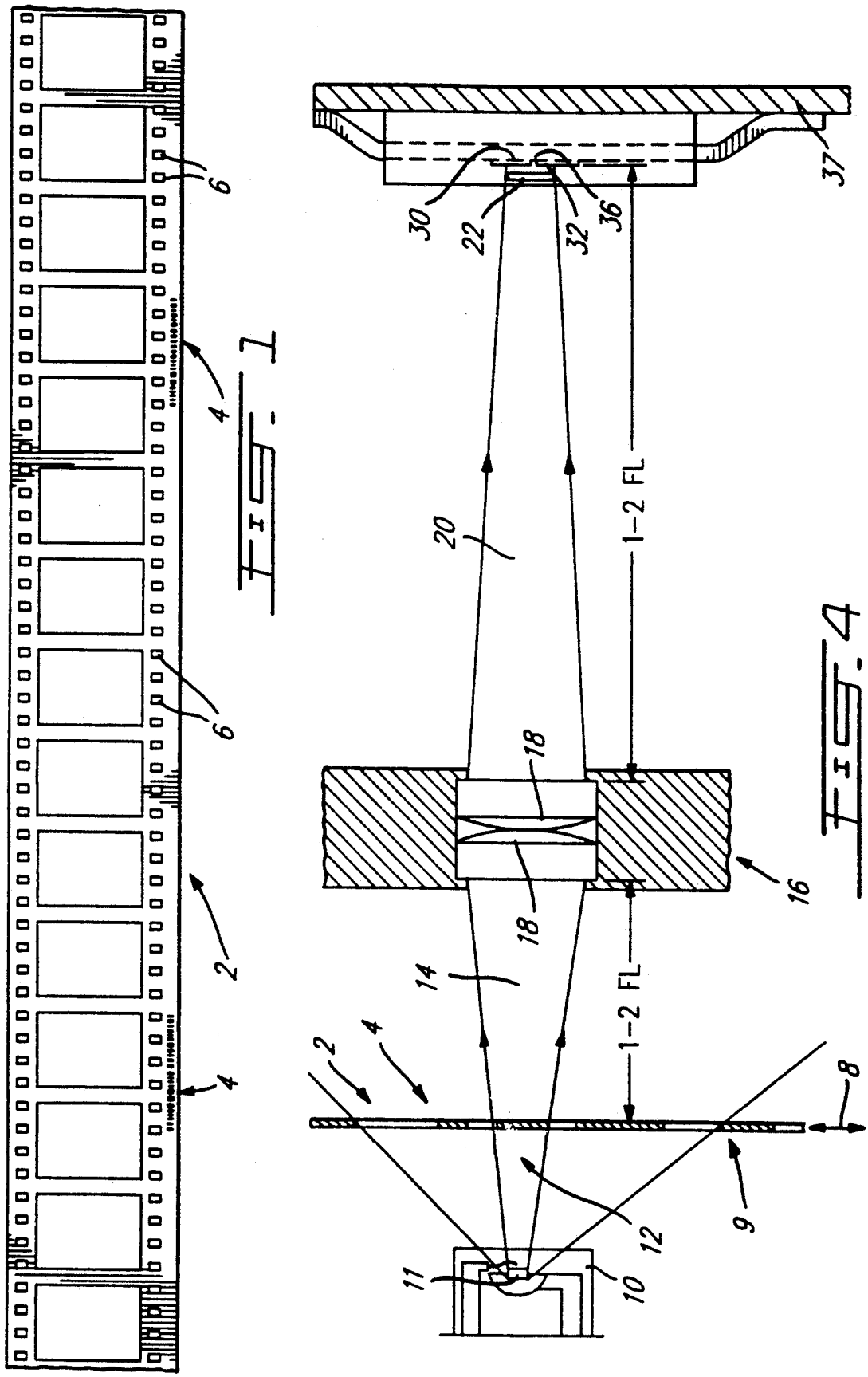

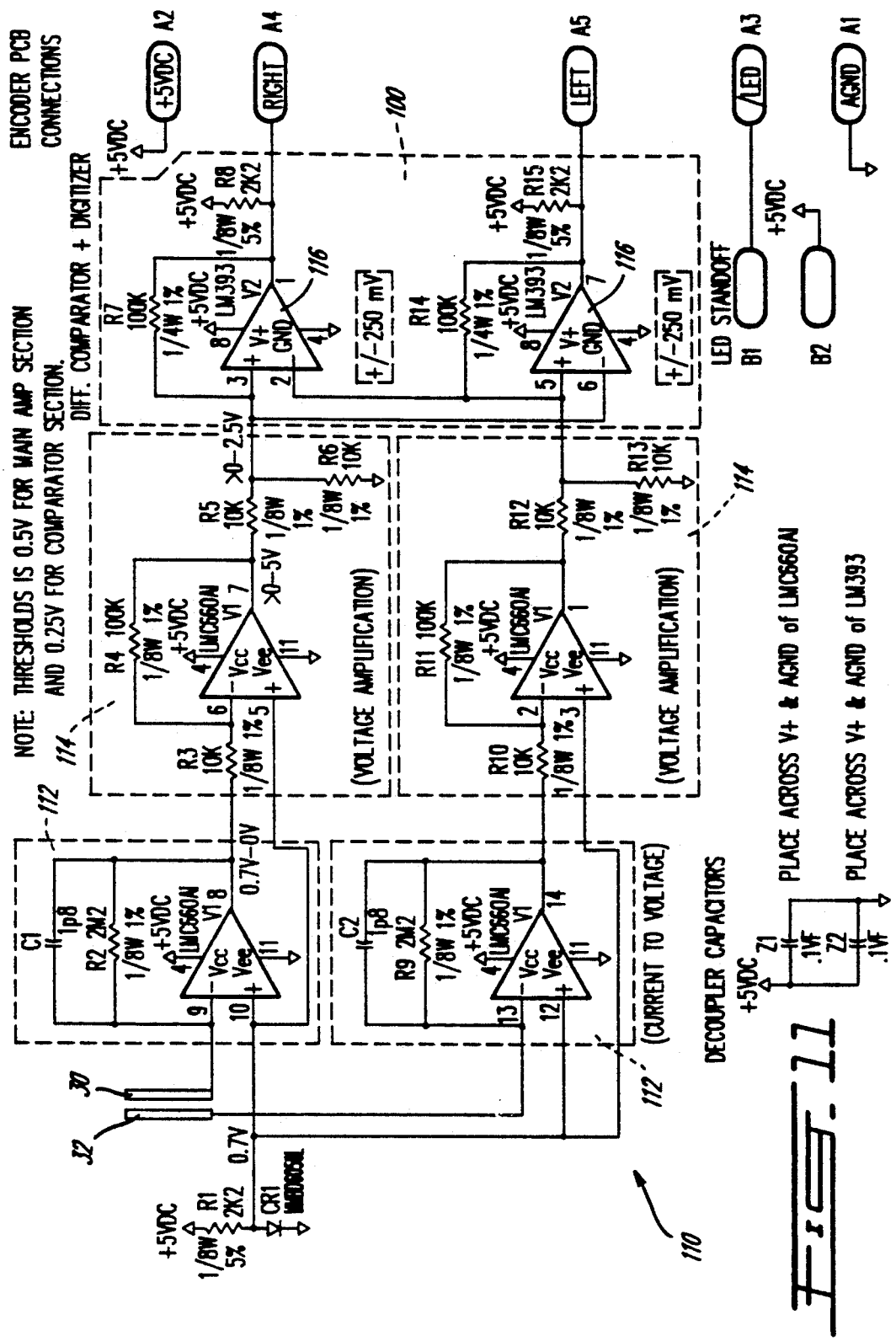

OPTICAL DUAL SENSOR BAR CODE SCANNING SYSTEM

FIELD OF THE INVENTION

The present application is a continuation of application Ser. No. 07/501,550 filed Mar. 30, 1990, now abandoned.

The present invention relates to systems for optically scanning a bar code and in particular, to a system for optically scanning a bar code provided on a film type media.

BACKGROUND OF THE INVENTION

Optical scanning systems for detecting bar codes provided on products are well known. Typically, these systems direct a light at the bar code which light is reflected to various degrees from the bar code whereby the spacing between individual light and dark bars of the code can be deciphered from the reflected light signal. Such reflecting systems operate well, but rely on a single signal from which the code is deciphered.

Eastman Kodak has recently introduced a new product into the market which includes edge code numbers in the form of bar codes provided at the edge of motion picture film. The film is manufactured in both negative and print film in 35 millimeters presently and will be introduced shortly into 16 millimeters product.

The edge code is exposed onto the film at the time of manufacturing by Eastman Kodak. The bar code pattern contains information relating to the manufacture and film type as well as a unique number. There is a unique bar code pattern every six inches of film stock. The unique number is such that it will not repeat on any position or roll of film for the next ten years of production. After the film is developed, the edge code becomes visible to the naked eye.

The edge code information gives an absolute indication of manufacture, film type, and location on the film in the number of feet and frames.

This edge code is provided at the edge beyond the perforations used to drive the film. The normal rate of travel of the film is approximately 1.5 feet per second, however, in fast forward or reverse, the speed of film travel can be about 15 feet per second. Thus, any scanning system must be capable of accurately reading the bar code, both at normal film speed as well as the higher rate of film speed used in a fast forward or reverse mode.

In contrast to bar codes placed on products, the exact characteristics of the film are not really known until the film has been developed. The properties of the bar code and the film can vary with the developing process as well as the overall speed of the film. The accuracy of the bar code is a result of the developing process and some loss in the exact edge distinction occurs due to the grain of the film as well as the effects of the development process which lowers the definition of the edges. The properties of one film to the next can vary considerably. With these factors, the bar code is difficult to consistently read.

When Kodak first introduced their edge code, they also introduced a reader circuit prototype which was capable of reading the bar code. Such a reader operated on the basis of a laser directed at the edge of the film producing light which was modulated by the bar code as the film moved past the light. The modulated light signal on the opposite side of the film was then used to decipher the bar code. With this type of structure, problems occurred with films of differing characteristics due to either their own characteristics and/or the effects of the development process. Such systems could be adjusted to operate, however the resulting structure was expensive and was not generally accepted in the marketplace.

There remains a need for a reader that can sense, decode and transmit or display the edge code accurately while still being relatively simple in operation and able to accommodate the varying characteristics of the film and the required speeds of recognition.

SUMMARY OF THE INVENTION

The present invention relates to a system for scanning of bar codes which relies on two sensors associated to sense the light source which has been modulated by the bar code, where the resulting signals of the sensors are slightly shifted in time. With this arrangement, the difference between the sensors output can be determined which provides an accurate means for determining the bar code used to modulate the light signal.

In accordance with an aspect, the present invention provides a system for optically scanning a bar code on a generally transparent medium comprising:

means for producing light on one side of the generally transparent medium, means for moving the generally transparent medium past the means for producing light such that the bars of the bar code interrupt the light and produce a modulated light signal according to the characteristics of the bar code on the opposite side of the generally transparent medium, sensing means for optically sensing the modulated light signal, the sensing means consisting of a first lead optical sensor means for generating a first signal and a second trailing optical sensor means for generating a second signal, the first and second sensor means being spaced apart in the direction of movement of the generally transparent medium such that the first and second signals are generally identical and are shifted in time relative to each other according to the space between the first and second sensor means, means for comparing the first signal and the second signal so as to obtain a bar code digital signal.

In accordance with a particular aspect, the present invention provides a system for optically scanning a bar code on a generally transparent medium comprising:

means for producing light on one side of the generally transparent medium, means for moving the generally transparent medium past the means for producing light such that the bars of the bar code interrupt the light and produce a modulated light signal according to the characteristics of the bar code on the opposite side of the generally transparent medium, sensing means for optically sensing the modulated light signal, the sensing means consisting of a first lead optical sensor means for generating a first signal and a second trailing optical sensor means for generating a second signal, the first and second sensor means being spaced apart in the direction of movement of the generally trapsarent medium such that the first and second signals are generally identical and are shifted in time relative to each other according to the space between the first and second sensor means, the combined width between outside edges of the first and second sensor means being less than the minimum width of a bar of the bar code represented in the modulated light signal, means for comparing the first signal and the second signal so as to obtain a bar code digital signal.

In accordance with the present invention, a system may include bar code decoder means for interpreting the bar code digital signal.

In accordance with the present ivnention, the transparent medium may comprise a motion picture film and the bar code may be disposed on an edge portion of the motion picture film.

In accordance with the present invention, the first and second sensor means may be spaced apart by a space equal to the width of the first and second sensor means.

In accordance with a further aspect, the present invention provides a method for optically scanning a bar code on a generally transparent medium comprising:

producing light on one side of the generally transparent medium, moving the generally transparent medium past the produced light such that the bars of the bar code interrupt the light and produce a modulated light signal according to the characteristics of the bar code on the opposite side of the generally transparent medium, optically sensing the modulated light signal using sensing means consisting of a first lead optical sensor means for generating a first signal and a second trailing optical sensor means for generating a second signal, the first and second sensor means being spaced apart in the direction of movement of the generally transparent medium such that the first and second signals are generally identical and are shifted in time relative to each other according to the space between the first and second sensor means, and comparing the first signal and the second signal so as to obtain a bar code digital signal.

BRIEF DESCRIPTION OF THE DRAWINGS

Preferred embodiments of the invention are shown in the drawings, wherein:

FIG. 1 illustrates a strip of film coded with an edge code;

FIG. 4 illustrates the optical scanning system;

FIG. 11 illustrates a schematic of the circuit for processing the sensed signals.

DETAILED DESCRIPTION OF THE PREFERRED EMBODIMENTS

Figure 3:
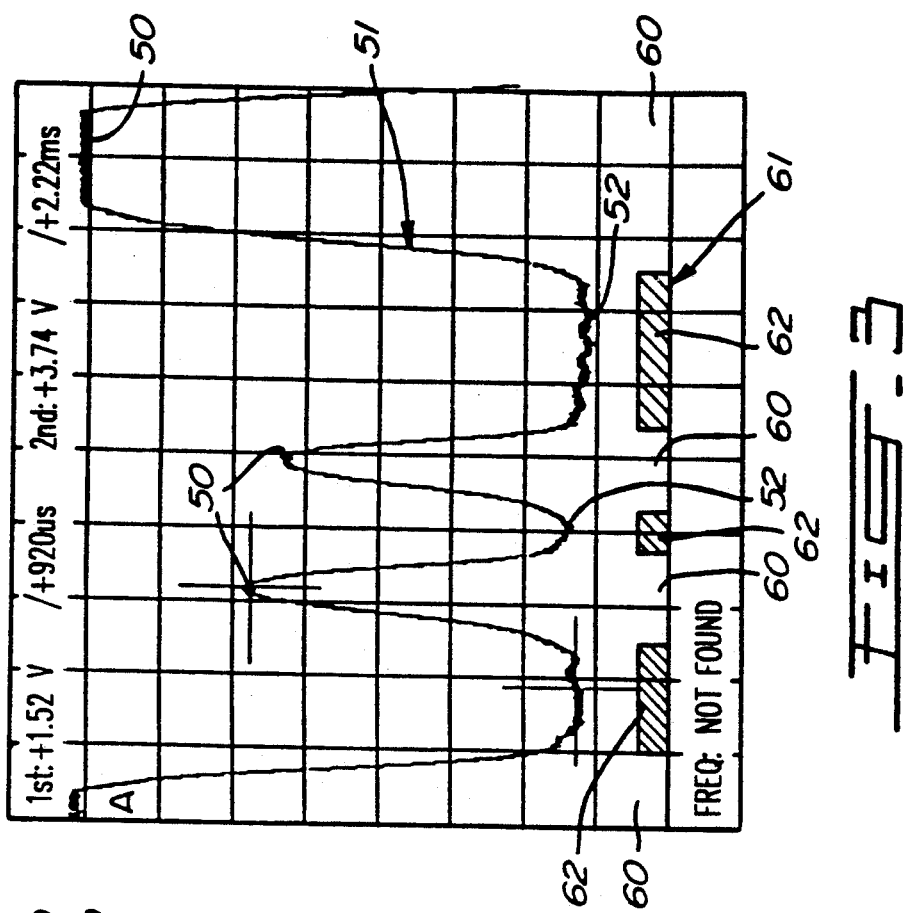
FIG. 3 displays a portion of the single signal of FIG. 2 relative to the corresponding portion of the bar code.

An exposed length of developed 35 millimeters film 2 is shown in FIG. 1 wherein the edge codes 4, comprising exposed bar codes on the film, are visible beyond the drive perforations 6 of the film 2. Each bar code 4 is typical of known bar codes defined by dark and light bars which collectively form the bar code. The film presently being marketed by Eastman Kodak under their trademark KEYKODE includes not only this bar code, but also manufacturer codes, film identification codes and other information along the edge of the film. All of these codes have different characteristics from that of the bar code 4 which must be read to allow the user to be able to determine where he is within the length of the film as well as an identification of the film. Each of the bar codes along the length of the film are unique and identify a particular location on the film.

The ability to read this bar code at normal operational speeds of about 100 feet per minute is generally required, however, on occasion, the fast forward speed or fast reverse speed is used which can be up to about 15 feet per second. Thus, the optical system for scanning of these bar codes must be capable of working at these higher speeds.

Figure 2:
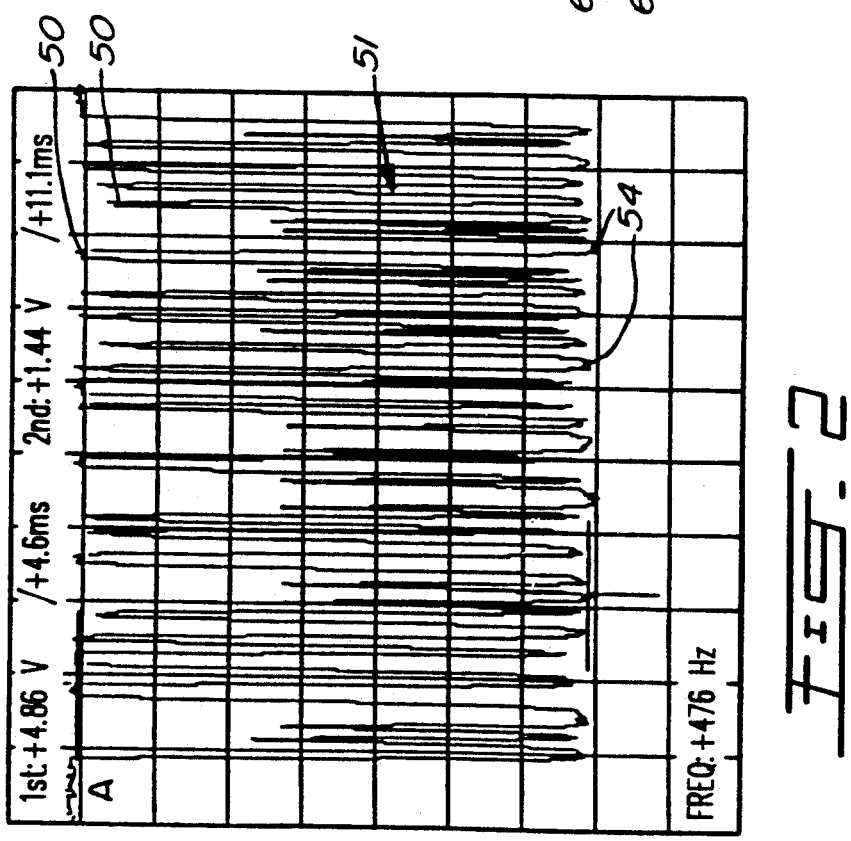
FIG. 2 is a display of a typical single signal resulting from scanning of a bar code.

FIG. 2 shows a typical output signal of a scanned bar code which has been scanned by exposure to a light beam on one side of the film and sensing the light on the opposite side of the film which has been modulated by the bar code as the bar codes shifts past the light source. As can be seen, the signal modulates between various peaks which indicate a light band as opposed to the troughs which indicate a dark band. The width of these bars are identified by the duration at that particular peak. The light bars are indicated as 50 in FIG. 2 and the dark bars are indicated as 54.

An expanded view of a portion of the signal 51 of FIG. 2 is shown in FIG. 3. In this case, the light bars are shown as 50 in the signal 51 and the dark bars are indicated by regions 52. The actual bar code is represented as 61 which comprises the light regions 60 and the dark bars 62. FIG. 3 best illustrates the fact that the light regions 60 or the spaces found in the bar code do not all result in the same amplitude of the signal and very small spaces produce a much smaller amplitude signal. This reduces the portion of the signal which can be effectively used for recognizing of the bar code.

FIGS. 2 and 3 have generally shown the type of signal which is produced when the modulated light signal is sensed by a sensor such as a photodiode. The reason that the signal quality with respect to a generally transparent or translucent medium is not as good as with respect to a printed bar code scanned by a reflective system, is due to the variation that occurs in the film, the loss of light transmitted through the film, accuracy problems in producing the bar codes on the film, and difficulty in cleanly defining the minimum spaces between dark bars of the code.

FIG. 4 illustrates a particular arrangement for sensing of the bar code. The optical scanning system 9 includes a light source 10 which, in this case, is shown as an LED which transmits red light at a wavelength of 660 nm. Kodak has already advised users of this technology of the preferred light for scanning of the film. This red light, and particularly this frequency of red light is suited for scanning of developed film. Other light sources are possible such as a laser, however the LED is preferred due to low cost.

The LED 11 produces a beam of light, generally shown as 12, directed at the bar code directly therebeneath. The film is shown as 2 with the bar code 4 located beneath the light source 10. As can be appreciated, only a portion of the bar code 4 is positioned within the light beam 12 and movement of the film 2 in the direction indicated as 8 progressively moves the bar code through the light beam 12. This results in a modulated light signal 14 provided on the opposite side of the film 2 which is collected by the focusing system 16 comprised of lenses 18. These lenses take the modulated light 14 and focus it on the photodiode sensors 30 and 32. The focused modulated light signal 20 has illustrated at the photodiodes 30 and 32 for a better understanding the bar codes 22 which are represented in this modulated focused light beam. Thus, as the film is advanced, the bar codes appear to advance over the sensors 30 and 32. Sensor 30 is the lead sensor and sensor 32 is the trailing sensor. These sensors are preferably photodiodes which are the same or within about 10% of one another. The combined width of sensors 30 and 32 is less than the effective minimum bar code space in the focused light at the sensors 30 and 32. The preferred arrangement has the width of the spacing 36 between sensors equal to or smaller than the width of the sensors 30 and 32, and the total width between outside edges of the sensors less than the width of the minimum bar. As can be seen, lead sensor 30 is upstream of the trailing sensor 32 and thus, a time shift will occur between the signals produced by these photodiodes. Sensors 32 and 34 are mounted on circuit board 37.

If an LED is used, the light may be completely unfocused (i.e. point source) or collimated into a beam. A Stanley Super Bright LED for Optical Fiber Communication FH1011 has proven satisfactory. The brighter the LED, the better because the signal to noise ratio increases as the gain of the amplifiers is decreased.

The LED must be placed far enough behind the film so that its image is not focused on the sensor. Ideally, the LED should be as close as possible for maximum brightness of the film image and thus signal. Thus, the distance is highly dependent on the depth of field of the focusing optics used. Placement of the LED between 1 and 2 millimeters from the film has proven satisfactory.

In some cases, it is desirable to increase the intensity of the LED, particularly when trying to read badly overexposed film or badly developed work print. In this case, the intensity of the LED can be varied from 50% to 150% brightness to compensate for the condition of the material being read. With the particular LED disclosed, the current thereof can be varied from 4 milliamperes and this range has been found satisfactory to compensate for all but the worst samples of over and underexposed negatives and work prints.

For most applications, the LED intensity will remain fixed at some intermediate setting satisfactory for reading a wide range of film samples with no changes to the LED intensity setting. The ability to vary the LED intensity allows for a calibration cycle that can initiated by the user and provides additional flexibility, reliability and interchangeability of components.

The calibration cycle sets the LED intensity at its lowest setting. The reader knows that the film is moving and by how much using an optical rotation encoder attached to the film sprocket wheel. Since there is a bar code every six inches of film, the microprocessor would know that the film has moved far enough to have read a bar code and in this way, would know if the LED intensity needs to be adjusted. As the film is moving over the sensor, the LED intensity is increased until valid bar codes are read. The LED intensity is further increased until valid bar codes are no longer read (i.e. the sensors are overloaded even during the dark bars). The LED intensity is then decreased to the midpoint between the setting where valid bar codes are read and where the sensors were overloaded. Thus, each film can be adjusted for optimum readability (reliability) at the start of each session by calibrating over the initial unused leader area of the film. Once performed, the calibration does not have to be performed unless the film characteristics have changed drastically, which is very rare.

Lenses 18 provide a distortion free focused image on the sensor so that a minimum element bar or space edge can be differentiated across the two sensor elements 30 and 32. The lenses 18 should have a minimum of spherical aberration and operate with a large aperture for maximum signal. Two identical plano-convex lenses in a RAMSDEN configuration are used, thus achieving low distortion with large aperture as well as low cost. The lenses are made of glass, have a diameter of 2.58 millimeters and have an effective focal length of 7 millimeters. The lenses are used convex side inward and touching. This produces an effective focal length of half the original single length or 3.5 millimeters. The entrance aperture is reduced by 20% to stop marginal rays from distorting the edges. The best results were achieved when the image was magnified by 1 to 1.5 times actual size.

The lenses 18 are preferably placed 1 to 2 focal lengths (F.L.) from the film 2 and 1 to 2 focal lengths from the sensors 32 and 34, depending upon the particular optics and degree of magnification desired.

The focused image of the back illuminated edge code falls onto the surface of the sensors 30 and 32. A Quadrant PIN photodiode sensor has proven satisfactory and is readily available. This is a high speed photodiode with four identical square sensors (72.5 micrometer sides) that are placed in a square formation with 5 micrometer spacing. The sensors are connected in parallel pairs to double the signal strength and define sensors 30 and 32. The photodiodes are matched to within 10% of each other.

Figure 5:
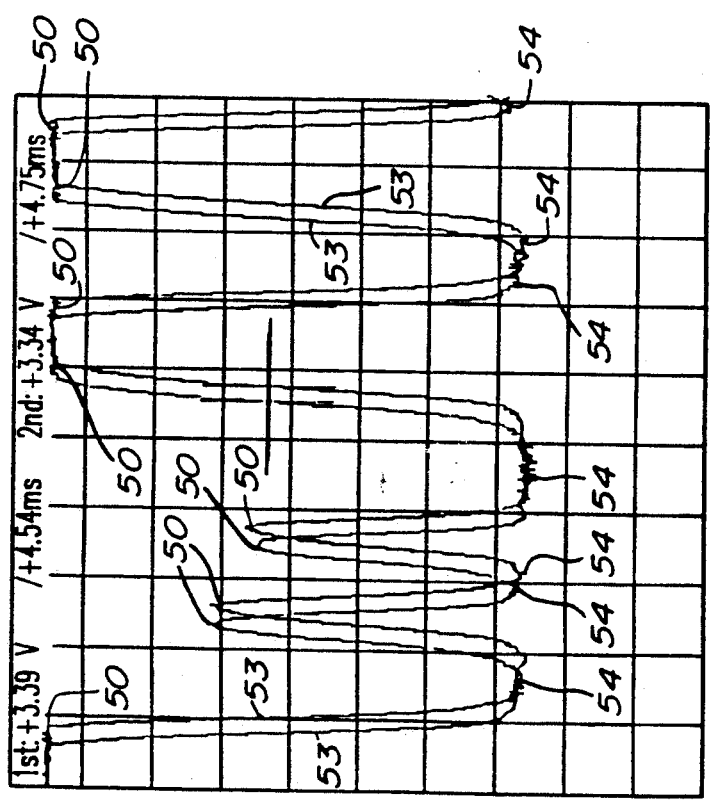
FIG. 5 displays a portion of the signals resulting from a bar code being scanned by the optical scanning system of FIG. 4.

The time shift between the signals of sensors 30 and 32 is best shown in the signals of FIG. 5 which represents essentially two generally identical signals A and B, with signal A advanced in time relative to signal B. Light regions of the bar code are provided or indicated by the peaks 50 in the upper part of the graph, whereas the dark regions are indicated by the troughs 54, and the generally vertically sections 53 indicate the transition from a light region to a dark region. The use of the two sensors 30 and 32, one trailing the other, results in identical signals being displaced in time and this displacement in time is used to extract information with respect to the bar code by differenti,al comparison of the the difference between signals A and B. As can be appreciated, the signals are generally identical except for the short duration where the lead sensor is sensing a dark region and the trailing sensor is still sensing the light region which has not yet cleared the sensor or vice versa. The difference between these signals is quite great and, in effect, can be used for detecting the edge between a bar and a space.

Figure 6:
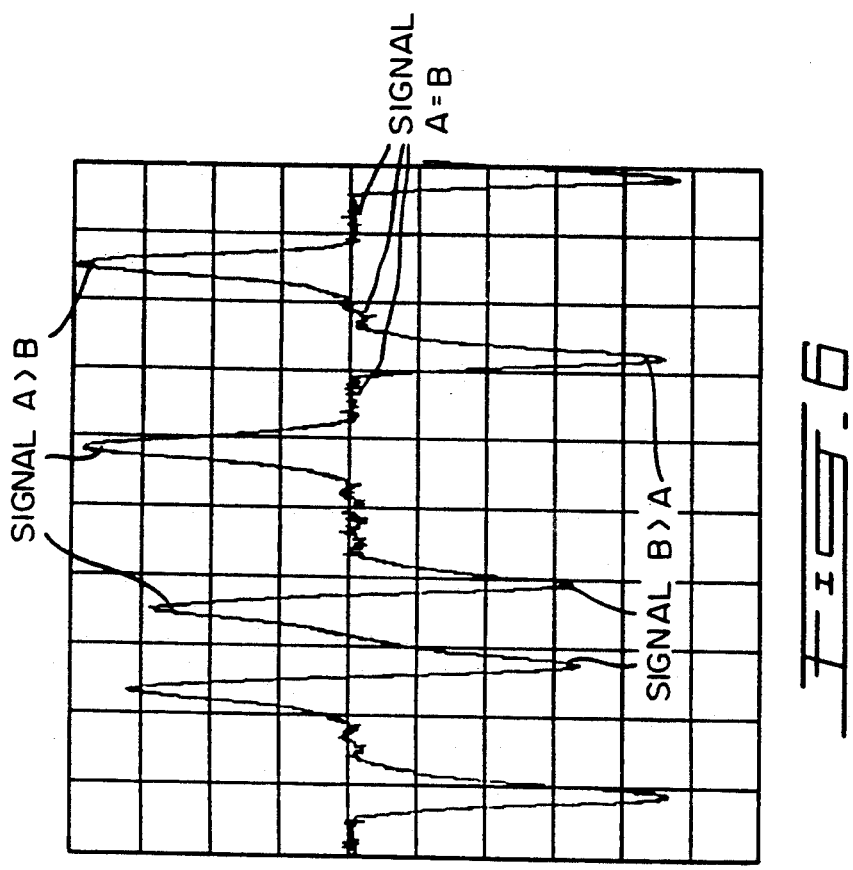
FIG. 6 displays the difference between the signals of FIG. 5.

This difference signal is shown in FIG. 6 where a scope has been used for differentiating between the lead signal A and the trailing signal B. The peaks in the top portion of the graph indicate that signal A is greater than signal B. The troughs in the lower portion of the graph indicate that signal B is greater than signal A. The small variations at the center of the graph indicate noise and errors associated with inaccuracies in the bar code developed on the film. The evaluation of the difference between the signals reduces considerably common mode noise, interference and ambient light.

Figure 7:
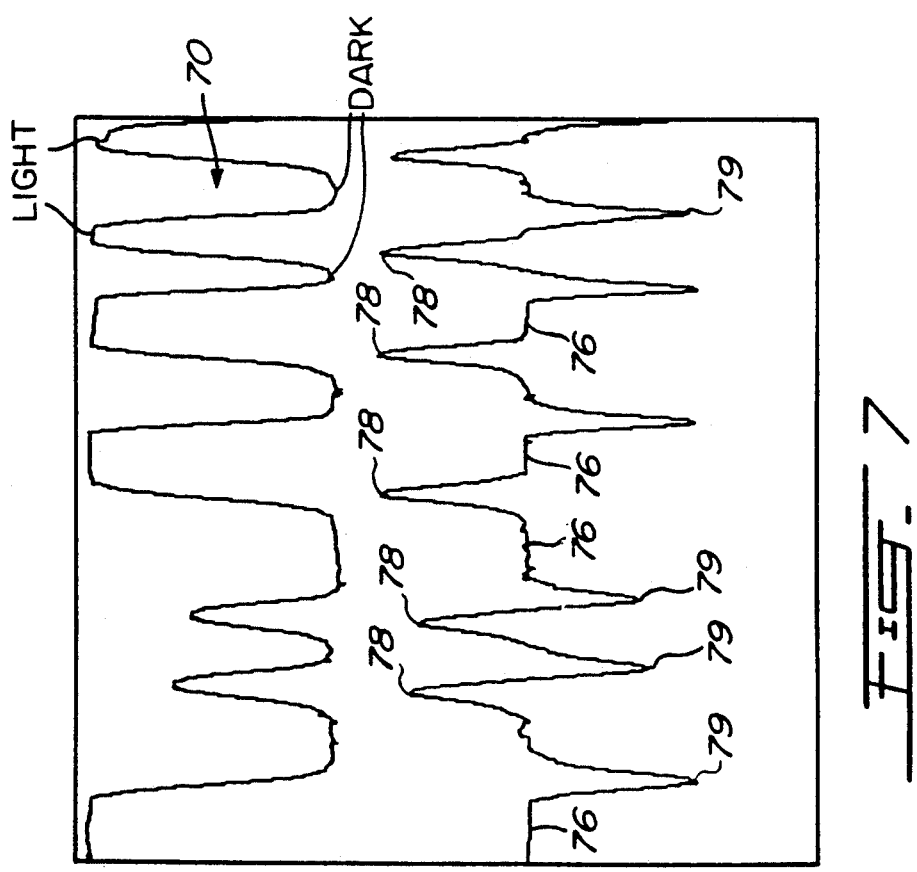
FIG. 7 illustrates a comparison of a single sensor output and the dual sensor output of the present invention.

FIG. 7 shows a graph of the difference signal resulting from the two sensors 30 and 32 compared to the signal resulting from a single sensor. The single sensor signal is shown as 70 in FIG. 7 and the difference signal is shown as 75 in FIG. 7. Regions 76 in signal 75 represent where signal A equals signal B, whereas the peaks 78 represent a point where signal A is greater than signal B, and the low points 79 represents areas where signal B is greater than signal A.

Figure 8:
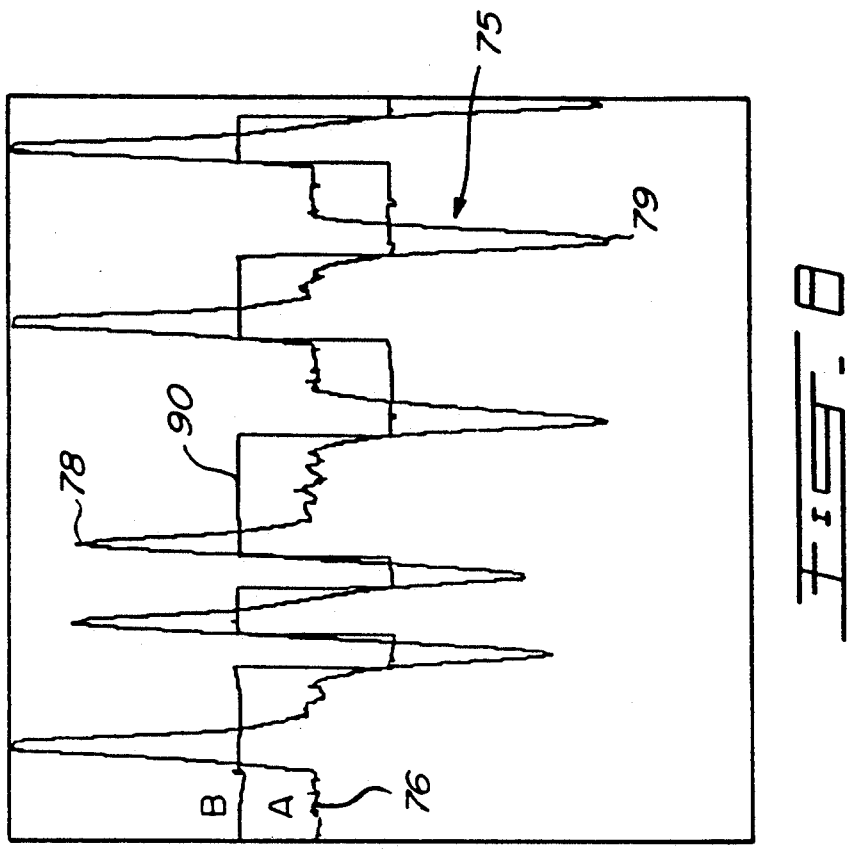
FIG. 8 illustrates the difference signal between the signals of the two sensors superimposed over the output from the comparator of FIG. 11.
Figure 9:
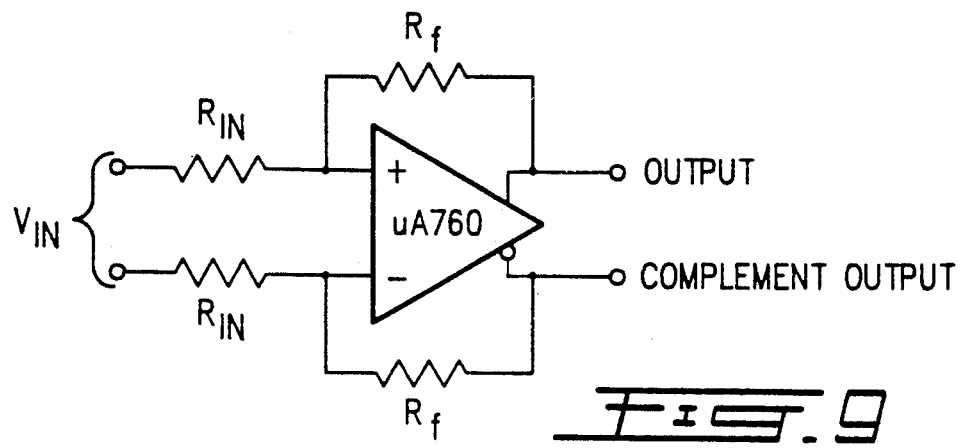
FIGS. 9 and 10 are schematics of voltage comparator circuits.

FIG. 8 shows the output of the difference comparator 100 shown in the circuit of FIG. 9. The signal 75 is shown, and on it is superimposed the signal 90 which in effect is the digitized bar code output from the last stage on the difference comparator 100. This signal 90 can easily be interpreted by a bar code decoder circuit or software.

The circuit 110 of FIG. 11 shows the photodiode sensors 30 and 32, each of which are connected to similar circuits which are eventually compared by the differential voltage comparator 100. The output of the photodiodes 30 and 32 convert the light they receive (i.e. the modulated focused light signal 20) into electric current. There is a linear relationship between the intensity of the light hitting these sensors and the current output they generate. The current of each sensor is amplified and converted into voltage using a transimpedance amplifier 112. This transimpedance amplifier is an amplifier that converts a current input into a voltage output. A first stage amplification can also occur of $2.2 \times 10E6$ which converts the nanoampere signal current from each of the sensors 30 and 32 to a voltage that varies from 0.7 volts (dark) to 0 volts (bright). An ultra low input bias current quad CMOS operation amplifier is used. This one package contains four identical operation amplifiers. The first two amplifiers are wired as two identical transimpedance amplifiers 112. The last two amplifiers are wired as simple voltage amplifiers 114. These voltage amplifiers 114 are set at 10 to 12 times voltage gain and provide an output of 0.7 volts (dark) to 5 volts (bright). Thus, up to output from the voltage amplifiers 114, there are two identical sensor amplifier systems with the only difference being that the two sensors are physically separated, and the edge to edge spacing of the sensors is less than the minimum spacing between bars of the bar code or the effective spacing between bars of the bar code in the focused modulated light signal 20. Each signal from the voltage amplifiers 114 are fed into a differential voltage comparator and digitizer arrangement 100 made up of two identical voltage comparators 116. The comparators 116 are wired symmetrically with hysteresis and cross coupled so as to form a symmetrical differential threshold. This comparator output is a digitally compatible signal which can be directly decoded by a bar code decoder circuit or software (not shown). The output of the second stage amplifier pairs 114 in this case must be attenuated so as not to exceed the maximum common mode input voltage of the voltage comparators 116. The particular comparator used, namely an LM393, cannot accept input voltages on its inputs greater than 3.5 volts at a supply of +5 volts. Because of this, the arrangement shown uses a simple voltage divider on the output of the second stage amplifiers which decreases the voltage by 50%.

Symmetrical positive feedback is used to generate symmetrical hysteresis of about 0 voltage difference between the two sensor outputs. The hysteresis is set to $+/-250$ millivolt, but since the sensor outputs are attenuated by a factor of 2, the actual signal threshold becomes $+/-500$ millivolts. This provides a 1 volt "deadband" that very effectively protects against distortion in the edges of the bar code, electrical noise, inaccuracies due to the graininess of the film and inaccuracies due to the pattern of overlapping dots used to expose the edge codes onto the film. Hysteresis can be varied for optimal sensing under worst case conditions.

Thus, once an edge is detected and the digital output switches, this output will not switch back until the inputs exceed their current levels by 1 volt in the opposite polarity. This opposite polarity indicates that the opposite edge has been detected and occurs suddenly, providing an accurate edge which can easily be used by bar code decoder circuit or software.

A voltage comparator compares the signal across its two inputs and switches its output depending on their difference. If the negative input is greater than the positive input, the comparator output remains low. If the positive input equals or exceeds the negative input, the comparator output switches high. There exists a point of instability where the two inputs are equal because of the high sensitivity of most comparators, in that the slightest noise on the inputs will cause the comparator to switch its output in relation to the noise, making one input appear less than the other. This problem occurs if the input signal switches slower than the maximum detection speed of the comparator. Thus, if the signal crosses zero (both inputs equal) and the difference exceeds that of the worst case noise faster than the comparator can detect the equality and switch its output, this instability is not a problem. A commonly used technique for dealing with this instability in the majority of cases is to use hysteresis.

Hysteresis is created by applying a small amount of positive feedback from the output of the comparator back to the positive input of the comparator. Thus, when an equality is detected at the inputs, the output switches and causes the input signal to switch rapidly past the equality. Thus, as long as the positive feedback is larger than the maximum noise to be encountered, no noise superimposed on the signal will be able to switch back the output until the input signal reverses and exceeds the hysteresis now applied.

Hysteresis can also be used to detect when one input exceeds the other by a fixed amount (threshold). The ratio of positive feedback to input signal sets this threshold.

Since the present invention is detecting both positive differences and negative differences equally spaced from zero (equality), a symmetrical hysteresis (threshold) about zero is required. Thus, the output switches high if the positive input exceeds the negative input by a fixed threshold and does not switch back until the negative input exceeds the positive input by the same, but opposite fixed threshold. This creates an area that is symmetric about zero (equality between the sensors) where the output will not change state even if the signal is noisy or not exactly zero (equal).

To achieve this symmetrical hysteresis about zero, positive feedback is applied to both inputs. Thus, the output is fed back to the positive input and the complement of the output must be fed back to the negative input.

Ideally a single difference output voltage comparator such as the μA760 can be used with both complimentary outputs fed back as positive feedback to their respective inputs as in FIG. 9. The problems with using a differential output voltage comparators relate to the fact that difference output voltage comparators are used in very high speed applications and require great care in circuit layout for proper operation. The circuitry must be built into a very small space, creating difficulties.

Figure 10:
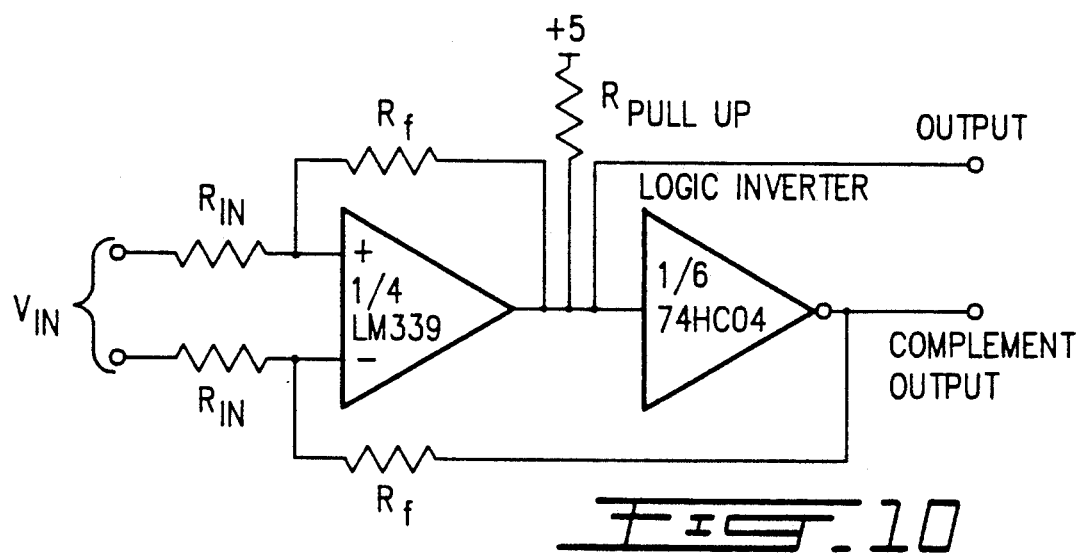
Figure 12:
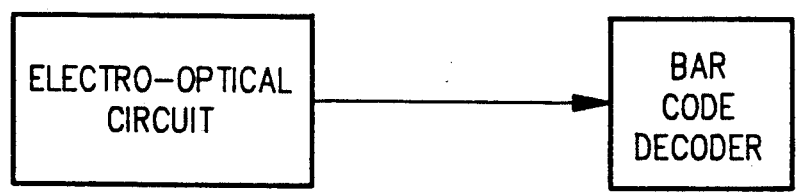
FIG. 12 is a block diagram illustrating in block form the electro-optical circuit of FIG. 11 and a bar code decoder.

Another way to achieve a complementary output is to actually invert the state of the output of a normal voltage comparator with the use of a logic circuit inverter (such as a 74HC04) as shown in FIG. 10, and using this as the complementary output. Again, this requires an extra integrated circuit package and requires additional space.

The difference comparator latch arrangement 100, as shown in FIG. 11, utilizes a single IC. The single IC consists of dual medium speed voltage comparators. By cross coupling the inputs of both comparators so that each comparator is sensing the opposite polarity from the other, a complementary out is made available without the need for an external inverter. The output of each comparator is the collector of a single transistor and thus a pull-up resistor was necessary to provide the necessary logic swing volt for a low output and almost 5 volts for a high of 0.25 volt for a low output and almost 5 volts for a high output.

The difference comparator and latch arrangement 100 of FIG. 11 consists of a dual comparator (LM393). Ordinary positive feedback is used on each voltage comparator by coupling a fixed amount of the output signal back to the positive input. Since the inputs of one voltage comparator are connected to the opposite input signals of the other voltage comparator, the output of each voltage comparator is the complement of the other. Thus, symmetric positive feedback for the negative inputs is creased by cross coupling the opposite voltage comparator's output as positive feedback to the respective negative input of each comparator.

The thresholds are set by the choice of feedback resistors used with respect to the input resistors. Equation 1 is used to determine the feedback resistors necessary for the desired symmetric threshold.

Equation 1

$$v_{th} = V_{OH}(R_{in}/R_f) - V_{OL}(R_{in}/R_f)$$

$V_{th}$ = the desired threshold voltage (positive direction only).

$V_{OH}$ = the high output voltage of the comparator, approximately 5 volts.

$V_{OL}$ = the low out voltage of the comparator, approximately 0.25 volts.

$R_f$ = the feedback resistor in ohms.

$R_{in}$ = the input resistance in ohms from the signal source.

The design uses input resistors in its attenuators of 10,000 ohms. Thus, the input resistance in ohms from the signal source is 5,000 ohms and the input signal is divided by 2. This was done to make sure that the common mode input voltage of the LM393 comparator was not exceeded. (The common mode input voltage of the LM393 is rated as the supply voltage minus 1.5 volts, thus at 5 volts supply the maximum common mode voltage is 5−1.5=3.5 volts, thus the need for the attenuated output signal from the 0.7 to 5 volt output of the sensor amplifiers.)

The required feedback resistors can thus be found by using equation 2 for any desired threshold.

Equation 2

$$R_f = R_{in}*(V_{OH} - V_{OL})/V_{th}$$

Initial readers have used feedback resistors in the range of 100,000 ohms to 200,000 ohms, creating thresholds of +/−0.5 volts to +/−0.25 volts around zero (sensor equality) respectively.

Remember that the input attenuator must be taken into account.

The transimpedance amplifier gain is equal to the feedback resistance, in this case 2.2 million (Rf=2.2*10E6 ohms). The output voltage can be calculated with respect to the input current from the sensor photodiodes from equation 3.

Equation 3

$$V_{output} = V_{bias} - I_{Photodiode}*R_f$$

$V_{output}$ = the output signal of the transimpedance amplifier.

$V_{bias}$ = the bias voltage connected to the non-inverting amplifier.

$I_{photodiode}$ = the signal current of the photodiode sensor caused by light hitting the sensor. Current increases from near zero (dark current) as the light hitting the photodiode increases.

$R_f$ = the feedback resistor of the transimpedance amplifier.

The bias voltage connected to the non-inverting amplifier is used because the operational amplifier (LMC660AI) is operating from a single +5 volt supply. The bias voltage is set using a forward conducting silicon diode and current limiting resistor. Thus, the bias voltage is set at approximately 0.7 volts.

The voltage gain of the second stage operational amplifier is set using equation 4.

Equation 4

$$\text{Voltage Gain} = R_f/R_{in}$$

$R_f$ = the feedback resistor.
$R_{in}$ = the input resistor.

The best response is obtained with a gain of greater or equal to 10.

The non-inverting input of the second stage operational amplifier is also set to the bias voltage as a common reference. This way, only the change from the 0.7 volts bias is amplified and not the 0.7 bias itself.

The present invention has been described with respect to the particular system for sensing of bar codes by evaluating the difference of the two signals produced by sensors which are physically separated The difference evaluation results in the cancellation of many factors which lead to distortion if a single sensor was used for detecting of a bar code. With such an arrangement, the desired accuracy and scanning speeds can be achieved.

Difference evaluation, as described above, for recognizing of bar codes is particularly useful in the scanning of bar codes on film or other generally transparent or translucent media, however it is not limited to this application and could easily be used in known reflecting systems. This difference evaluation method may be used in reflecting systems where high speed or improved accuracy is required. The difference evaluation method is relatively inexpensive and provides consistent results which are less affected by outside considerations and/or imperfections in the bar code.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A system for optically scanning a bar code on a generally transparent media comprising:
   means for producing light on one side of said generally transparent media,
   means for moving said generally transparent media past the means for producing light such that the bars of the bar code interrupt the light and produce a modulated light signal according to the characteristics of the bar code on the opposite side of the generally transparent media,
   sensing means for optically sensing the modulated light signal, said sensing means consisting of a first lead optical sensor means for generating a first signal and a second trailing optical sensor means for generating a second signal, said first and second sensor means being spaced apart in the direction of movement of the generally transparent media such that the first and second signals are generally identical and are shifted in time relative to each other according to the space between the first and second sensor means,
   means for comparing the first signal and the second signal so as to obtain a bar code digital signal.

2. A system as defined in claim 1 including bar code decoder means for interpreting said bar code digital signal.

3. A system as defined in claim 1 wherein the transparent medium comprises a motion picture film and said bar code is disposed on an edge portion of the motion picture film.

4. A system for optically scanning a bar code on a generally transparent media comprising:
   means for producing light on one side of said generally transparent media,
   means for moving said generally transparent media past the means for producing light such that the bars of the bar code interrupt the light and produce a modulated light signal according to the characteristics of the bar code on the opposite side of the generally transparent media,
   sensing means for optically sensing the modulated light signal, said sensing means consisting of a first lead optical sensor means for generating a first signal and a second trailing optical sensor means for generating a second signal, said first and second sensor means being spaced apart in the direction of movement of the generally transparent media such that the first and second signals are generally identical and are shifted in time relative to each other according to the space between the first and second sensor means, the combined width between outside edges of the first and second sensor means being less than the minimum width of a bar of said bar code represented in the modulated light signal,
   means for comparing the first signal and the second signal so as to obtain a bar code digital signal.

5. A system as defined in claim 4 wherein the first and second sensor means are of equal width and are spaced apart by a space equal to the width of the first and second sensor means.

6. A system as defined in claim 4 wherein the transparent medium comprises a motion picture film and said bar code is disposed on an edge portion of the motion picture film.

7. A method for optically scanning a bar code on a generally transparent media comprising:
   producing light on one side of the generally transparent media,
   moving said generally transparent media past the produced light such that the bars of the bar code interrupt the light and produce a modulated light signal according to the characteristics of the bar code on the opposite side of the generally transparent media,
   optically sensing the modulated light signal using sensing means consisting of a first lead optical sensor means for generating a first signal and a second trailing optical sensor means for generating a second signal, said first and second sensor means being spaced apart in the direction of movement of the generally transparent media such that the first and second signals are generally identical and are shifted in time relative to each other according to the space between the first and second sensor means,
   comparing the first signal and the second signal so as to obtain a bar code digital signal.

8. A method as defined in claim 7 wherein the transparent medium comprises a motion picture film and said bar code is disposed on an edge portion of the motion picture film.

* * * * *